(No Model.)
R. RIETSCHLIN.
DEVICE FOR HOLDING AND MIXING STOVE POLISH.
No. 317,579. Patented May 12, 1885.
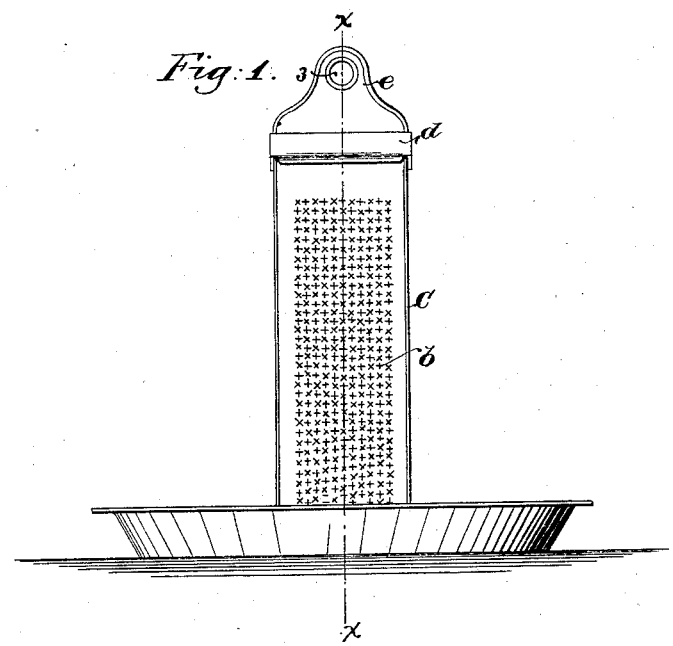
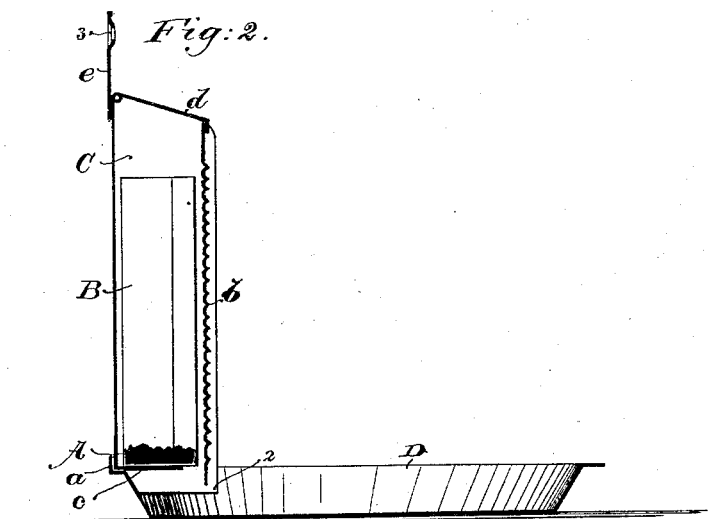
Witnesses,
Henry Marsh.
Bernice J. Noyes.
Inventor,
Reinhard Rietschlin.
by Lemby & Gregory
attys

UNITED STATES PATENT OFFICE.

REINHARD RIETSCHLIN, OF BOSTON, MASSACHUSETTS.

DEVICE FOR HOLDING AND MIXING STOVE-POLISH.

SPECIFICATION forming part of Letters Patent No. 317,579, dated May 12, 1885.

Application filed May 26, 1884. (No model.)

*To all whom it may concern:*

Be it known that I, REINHARD RIETSCHLIN, of Boston, county of Suffolk, State of Massachusetts, have invented an Improvement in a Stove-Polish Holder, Grater, and Pan, of which the following description, in connection with the acompanying drawings, is a specification, like letters on the drawings representing like parts.

My invention has for its object the production of an article adapted to hold a package of stove-polish, to grate the same into a pan when polish is to be used, the grated polish being mixed in the pan in which it is grated.

My invention consists, essentially, of a pan, a polish-holder, and a grater, the polish-holder being rigidly connected with the pan to serve as a handle by which to support the pan.

Figure 1 in elevation represents a stove-polish holder, grater, and pan embodying my invention, and Fig. 2 a vertical section thereof in the line $x\ x$.

The stove-polish A, done up in a suitable paper or package, B, will be contained in the handle-like case or box C, rigidly connected at its rear side near its bottom with the flange $a$ of the pan D. The lower end, 2, of the box or case C terminates above the bottom of the pan.

The front side of the box or case is provided with a grater, $b$, made in the form of an ordinary nutmeg-grater, and the said case near its lower end has a narrow projecting shelf, upon which the lower end of the package of stove-polish rests when not in use, as in the drawings, Fig. 2.

The upper end of the case C is provided, as shown, with a hinged cover, $d$, and at its upper end the said case has an extension, $e$, provided with a hole, 3, which enables the polish-holding device described to be hung upon a nail when not in use.

The polish when placed against the grater $b$ and rubbed up and down will be grated and will fall into the pan D, in which it will be mixed with suitable liquid, the polish so mixed being taken from the pan by a brush or otherwise, and applied to the stove.

I claim—

1. The pan D, combined with the rigidly-attached handle or case C, to contain a package of stove-polish, said handle or case being at an angle with relation to the pan, substantially as described.

2. The pan D, and its rigidly-attached case or handle C, having the cover $d$, and provided at one side with a grater, $b$, to operate substantially as described.

3. The pan D, and the rigidly-attached handle or case C, provided with the grater $b$ and with a support, $c$, for the end of the package of polish, substantially as described.

In testimony whereof I have signed my name to this specification in the presence of two subscribing witnesses.

REINHARD RIETSCHLIN.

Witnesses:
G. W. GREGORY,
B. J. NOYES.